US008015224B1

(12) United States Patent
Chaichanavong et al.

(10) Patent No.: US 8,015,224 B1
(45) Date of Patent: Sep. 6, 2011

(54) ENTROPY SOURCE FOR RANDOM NUMBER GENERATION

(75) Inventors: Panu Chaichanavong, Mountain View, CA (US); Tze Lei Poo, Sunnyvale, CA (US); Zining Wu, Los Altos, CA (US); Saeed Azimi, Union City, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 944 days.

(21) Appl. No.: 11/949,487

(22) Filed: Dec. 3, 2007

Related U.S. Application Data

(60) Provisional application No. 60/882,058, filed on Dec. 27, 2006.

(51) Int. Cl.
G06F 7/58 (2006.01)
(52) U.S. Cl. ...................................... 708/254
(58) Field of Classification Search ........... 708/250–256
See application file for complete search history.

(56) References Cited

U.S. PATENT DOCUMENTS

| | | | | |
|---|---|---|---|---|
| 5,757,923 A * | 5/1998 | Koopman, Jr. | ............... | 708/250 |
| 6,542,618 B1 * | 4/2003 | Rhoads | ............... | 382/100 |
| 6,687,721 B1 * | 2/2004 | Wells et al. | ............... | 708/250 |
| 7,359,509 B2 * | 4/2008 | Campagna et al. | ............... | 708/250 |
| 7,398,287 B2 * | 7/2008 | An | ............... | 708/252 |
| 7,496,616 B2 * | 2/2009 | Chari et al. | ............... | 708/250 |
| 7,715,565 B2 * | 5/2010 | Kimmel et al. | ............... | 380/281 |
| 7,813,503 B2 * | 10/2010 | Campagna et al. | ............. | 380/44 |
| 2002/0029341 A1 * | 3/2002 | Juels et al. | ............... | 708/135 |
| 2003/0037079 A1 * | 2/2003 | Wilber | ............... | 708/250 |
| 2004/0223608 A1 * | 11/2004 | Oommen et al. | ............... | 380/28 |
| 2006/0235917 A1 * | 10/2006 | Manber | ............... | 708/250 |
| 2006/0242407 A1 * | 10/2006 | Kimmel et al. | ............... | 713/166 |
| 2007/0180009 A1 * | 8/2007 | Gutnik | ............... | 708/250 |
| 2008/0063190 A1 * | 3/2008 | Campagna et al. | ............. | 380/44 |
| 2009/0265112 A1 * | 10/2009 | Wilber et al. | ............... | 708/255 |

OTHER PUBLICATIONS

Barker, E., et al., National Institute of Standards and Technology, Special Publication 800-90, "Recommendation for Random Number Generation Using Deterministic Random Bit Generators (Revised)," Mar. 2007.

National Institute of Standards and Technology, Federal Information Processing Standards Publication 140-2, "Security Requirements for Cryptographic Modules," May 25, 2001.

* cited by examiner

*Primary Examiner* — David H Malzahn

(57) ABSTRACT

In a device having a data channel, in which random numbers are needed, such as a data storage device that uses random numbers to generate keys for cryptographic applications, random numbers are generated by a deterministic random bit generator seeded by bits derived from noise on the channel itself. The bits may be extracted from the least significant bits of the data signal after it is digitized, because those bits correspond to the noise in the signal. The extraction may occur immediately after digitization, or after subsequent filtering. A data signal emulator may be provided to simulate a data signal if a seed is required at a time when there is no data activity on the channel. The extracted bits may be post-processed to remove bias before the seed is provided to the deterministic random bit generator.

17 Claims, 14 Drawing Sheets

ENTROPY SOURCE FOR RANDOM NUMBER GENERATION

CROSS REFERENCE TO RELATED APPLICATION

This claims the benefit of U.S. Provisional Patent Application No. 60/882,058, filed Dec. 27, 2006, the contents of which are hereby incorporated by reference herein in their entirety.

BACKGROUND

This disclosure relates to an entropy source for the generation of random numbers, and more particularly for seeding a random number generator.

Random number generation techniques are well-known. Most commonly, random numbers or bits are generated by providing a "pseudorandom" number or bit generator which generates numbers or bits in a deterministic way (such a pseudorandom number generator may be referred to as a "deterministic random number, or bit, generator") but accepts an input, known as a "seed," that causes the output to differ. Thus, in very early and primitive "random" number generators, the deterministic random number generator may have been a memory preprogrammed with a large number of "random" entries, which output the next one of those entries each time it was called, starting from the first entry each time it was powered up. This very simple list of numbers could be seeded by multiplying the output by the time of day, taken from the system clock. For primitive applications, this may have been sufficient.

More sophisticated deterministic random bit generators (DRBGs) may rely on an algorithm rather than a list, but are equally predictable once the seed is known. Thus, the randomness of the output depends on the randomness of the seed.

One common use for random numbers is in key generation for data security operations such as encryption/decryption and authentication. Such operations are becoming increasingly common in data storage devices. In data storage devices, short access times are important. Therefore, little time is available for generating random numbers without affecting data throughput, and yet, while current technology does not allow the generation of truly random numbers, the random numbers, and therefore the seeds, should be as close as possible to random for maximum security. Henceforth, these will be referred to as "reliably" random numbers.

SUMMARY

In accordance with embodiments of the present invention, reliably random numbers are generated by a relatively fast deterministic random bit generator, seeded by an entropy source generator based on a non-deterministic physical phenomenon in the device for which the random numbers are being generated. Although the DRBG is required to be relatively fast, the entropy source generator need not be as fast, because the DRBG typically will not require frequent reseeding. Indeed, depending on the nature of the DRBG, the DRBG may need to be seeded so infrequently as to require, at one extreme, seeding only once during the lifetime of the device, unless the reseeding is initiated early because of, e.g., security concerns.

Any type of known DRBG may be used. For example, a DRBG can be implemented with components that are already present in the device, as discussed in more detail below. However, other arrangements also are possible, and the type of known DRBG may be dictated by the use or purpose for which the random numbers or bits are required. For example, for cryptographic applications, the DRBG in some embodiments may comply with a known standard, such as National Institute of Standards and Technology (NIST) Special Publication 800-90, or Federal Information Processing Standard (FIPS) Publication 140-2. Adherence to standards may also assure that the random numbers are as reliably random as they need to be.

In accordance with the invention, the entropy source generator relies on a natural source of entropy to generate random bits to seed the DRBG. Any fluctuating natural phenomenon can be used. Preferably, the phenomenon is one whose effects are inherently available in the device, rather than one that requires special hardware to detect. For example, thermal/temperature fluctuations can be used.

In a data storage device incorporating the invention, noise in the data channel itself can be used. In one embodiment, during a read event, after the data read from the storage device are digitized, bits representing noise are extracted from the data. Specifically, because the noise is more likely to reside in the lower range of the signal rather than the upper bits (if it were otherwise, the noise would overwhelm the data), the least significant bits are sampled for use in deriving a seed. These bits may be used directly, or may be further processed—e.g., to remove any bias that may exist in the entropy source—and then used to seed the DRBG. As an alternative, if a seed is needed when a read operation is not being performed and is not about to be performed, a "loop-back" mode can be used in which a read signal is emulated. Although in that case the noise will derive only from channel noise rather than from a combination of media noise and channel noise, the randomness of the noise would be sufficient.

In another embodiment, where not many random numbers are needed, the bits derived from the entropy source—either directly or after post-processing—may be used as the random numbers themselves, without using a DRBG.

In the case of a hard disk drive controller, after the data are read and sampled, they are digitized and filtered through a number of components. In accordance with the invention, the least significant bits—i.e., "the noise bits"—may be sampled at any point after the data are digitized. The noise bits may be sampled immediately after digitization—i.e., after the analog-to-digital converter. However, they can be sampled anywhere else in the channel, because filtering will not increase the random nature of the noise bits.

Therefore, in accordance with embodiments of the present invention, there is provided a method for generating random numbers for use with a device having a data channel subject to noise. The method includes generating reliably random seeds from the noise, and using those reliably random seeds to seed a deterministic random bit generator. A random number generator operating in accordance with the method also is provided.

An embodiment of a random number generator may comprise means for generating reliably random seeds from a data channel subject to noise, and means for using said reliably random seeds to seed a deterministic random bit generator.

The random number generator of this embodiment may further comprise means for post-processing said extracted bits to remove bias therefrom.

The random number generator of this embodiment may further comprise means for reading a source of analog data, and means for converting said analog data to a digital signal, wherein said means for generating extracts bits from said digital signal after conversion. The random number generator of this embodiment may further comprise means for filtering said digital signal, wherein said means for generating extracts said bits after said conversion and before said filtering. The random number generator of this embodiment may further comprise means for filtering said digital signal, wherein said means for generating extracts said bits after at least a portion of said filtering. That means for generating may extract said bits after said filtering.

The random number generator of this embodiment may further comprise means for emulating a data signal to generate entropy bits when there is no active data signal on said data channel.

BRIEF DESCRIPTION OF THE DRAWINGS

The above and other advantages of embodiments of the invention will be apparent upon consideration of the following detailed description, taken in conjunction with the accompanying drawings, in which like reference characters refer to like parts throughout, and in which.

DETAILED DESCRIPTION embodiments of the invention will now be described with reference to FIGS. 1-6.

Figure 1:
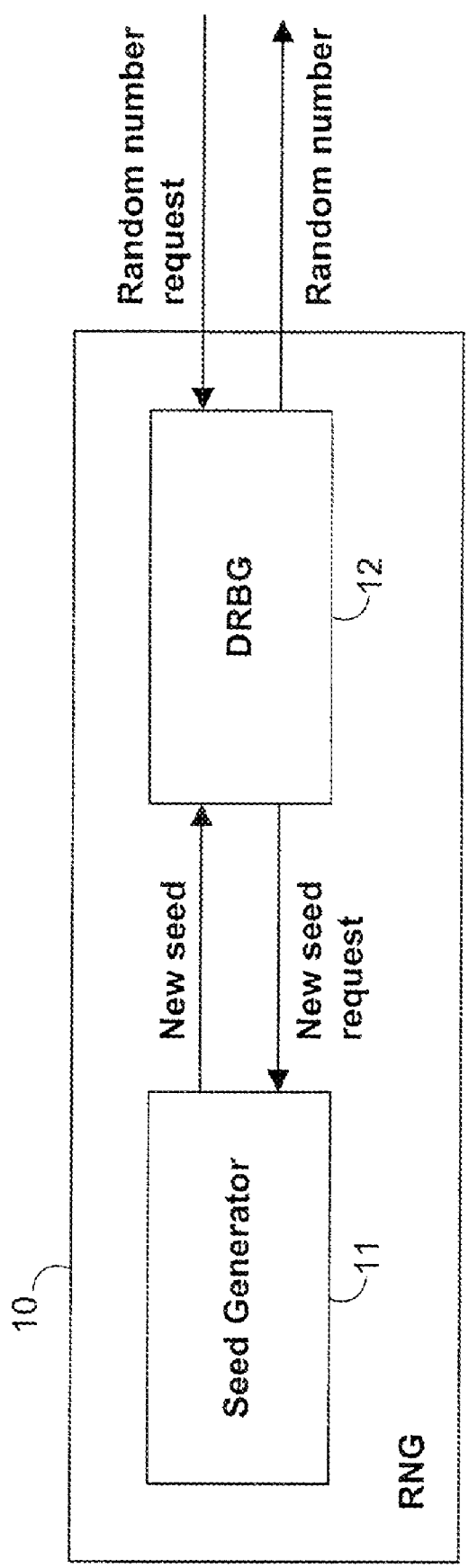
FIG. 1 is a schematic representation of a generic random number generator.

FIG. 1 shows the general structure of a generic random number generator (RNG) 10, including a seed generator 11 and a DRBG 12. As can be seen, DRBG 12, and hence RNG 10, provides random number as an output 13 upon receipt of an external request 14. DRBG 12 bases output 13 on an inputted seed 15 output by seed generator 11, usually in response to request 16 from DRBG 12. Although DRBG 12 itself is deterministic, as its name implies, RNG 10 as a whole can be considered nondeterministic (i.e., random) if seed generator 11 is good enough (i.e., random enough).

In a disk drive embodiment, random numbers may be used to establish and/or authenticate a secure connection, for key generation, etc. These operations do not directly affect data throughput. Therefore, while RNG 10 may be implemented in hardware, there would not be any significant performance penalty if it were implemented in firmware.

DRBG 12 should provide random numbers on demand. Several possible DRBGs are recommended by the National Institute of Standards and Technology in the aforementioned Special Publication 800-90, including Hash DRBG, HMAC DRBG (Key-Hashed Message Authentication Code DRBG), and CTR DRBG (Counter Mode DRBG). In an exemplary disk drive embodiment, DRBG 12 may be a CTR DRBG based on an AES-128 (Advanced Encryption Standard 128).

On the other hand, seed generator 11 can operate slowly, because seeds are not needed often. For example, a CTR-DRBG-based DRBG may need a new seed only after $2^{48}$ calls. Even at one call per second in continuous operation, a new seed would not be needed for $2^{48}$ seconds $\approx 2.8 \times 10^{14}$ seconds or approximately 8.9 million years. Even if one million calls were made every second, a new seed would be needed only every few years. Thus, seed generator 11 could operate relatively slowly, especially if DRBG 12 requests a seed in advance after receiving a certain number of calls for random numbers prior to its limit being reached. Even if a seed is needed unexpectedly, such as in the case of user request because of concern that the security of the current seed has been compromised, a delay in responding to such requests would not affect data throughput. The effect of a slow seed generator 11 could be further mitigated by generating a succession of seeds in advance as long as they can be stored securely. A new seed would then be available instantly upon request.

Figure 2:
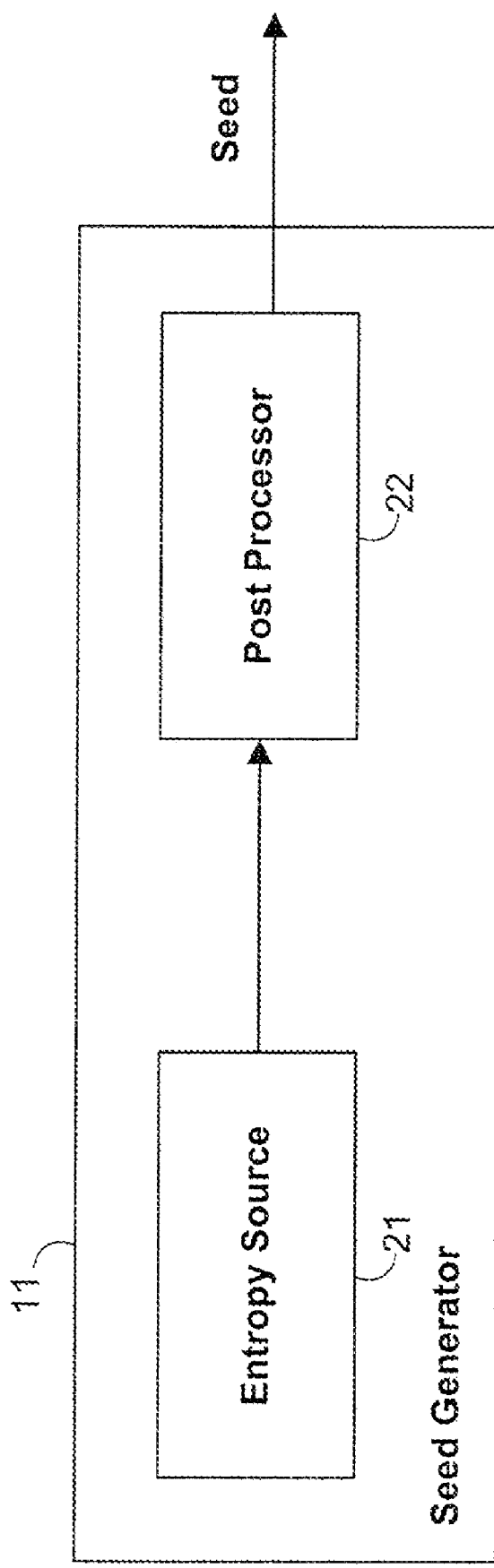
FIG. 2 is a schematic representation of a seed generator for use in the random number generator of FIG. 1.

FIG. 2 shows an exemplary seed generator 11 containing an entropy source 21 and a post-processor 22. Entropy source 21 may be based on any substantially truly random physical phenomenon (as discussed both above and below), but in general should satisfy several desirable properties. First, the entropy bits should be independent and uncorrelated. Second, entropy source 21 should be secure, meaning that one should not be able to predict the next bit of entropy based on the previous observations, nor should one be able to deduce past bits based on present observations, so that if someone were to learn certain bits, neither past nor future seeds could be determined. Finally, entropy source 21 should be unbiased, meaning that the probability of occurrence of a "1" equals to probability of occurrence of a "0".

The latter property is not easy to achieve in practice. Therefore, post-processor 22 may be provided. Post-processor 22 may apply any well-known technique to remove any bias that may exist in entropy source 21. For example, for a Bernoulli random variable X, the bias $b_x$ may be defined as the measure of how close X is to being a "fair coin":

$$b_x = |P(X=1) - \tfrac{1}{2}| = |P(X=0) - \tfrac{1}{2}|$$

Note that b is between 0 and ½, with b=0 being the value for a "fair coin," and b=0.5 being the value for a constant random variable (i.e., one with no randomness at all).

Therefore, if $\{X_i\}$ is a sequence of independent Bernoulli random variables with probability of success $\{p_i\}$, where the $p_i$'s are between 0 and 1, and X is the binary exclusive-OR of the $X_i$'s, then the bias of X is given by $$b_X = 2^{n-1} \prod_{i=1}^{n} b_i = 1/2 \prod_{i=1}^{n} (2b_i)$$

This suggests that one way to remove the bias from an entropy source is to exclusive-OR a number of random bits together. This effectively is a form of downsampling of the entropy bits, which is acceptable because many more bits are generated than actually may be needed.

For example, if the entropy source produces a stream of independent Bernoulli random variables having probability of success equals to 0.75, then the bias for $X_i$ is 0.25, the bias of X is equal to $0.5 \times (2 \times 0.25)^n = 0.5 \times 0.5^n$. If 15 variables are XORed, then n=15 and the bias is approximately $1.5 \times 10^{-5}$, which is negligible.

Figure 3:
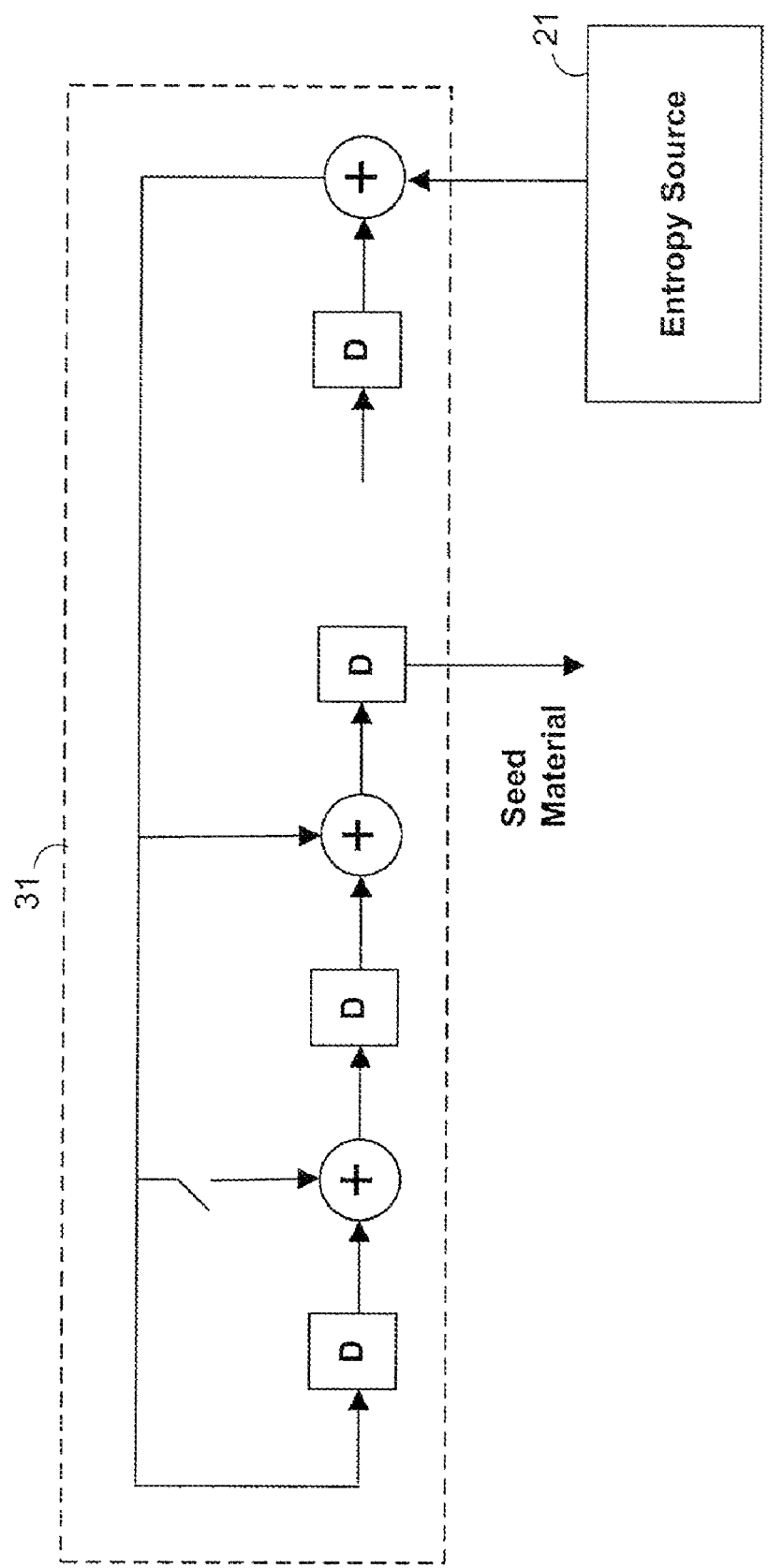
FIG. 3 is a schematic representation of the seed generator of FIG. 2 showing one embodiment of a post-processor.

Therefore, one implementation of post-processor 22 is linear feedback shift register 31 of FIG. 3, which corresponds to an irreducible polynomial. This guarantees a long period before the output bits start repeating. This circuit also satisfies the foregoing requirement that the output be an exclusive-OR of the input bits.

Returning to entropy source 21, it may be any physical phenomenon that can be measured on the device, including temperature or thermal fluctuations, etc. In accordance with the invention, in the case of the read data channel of a data storage device, inherent channel noise, which may include as components both media noise, introduced in the reading of data from the disk surface, and electronic noise introduced subsequently, although media noise is the dominant component.

Figure 5:
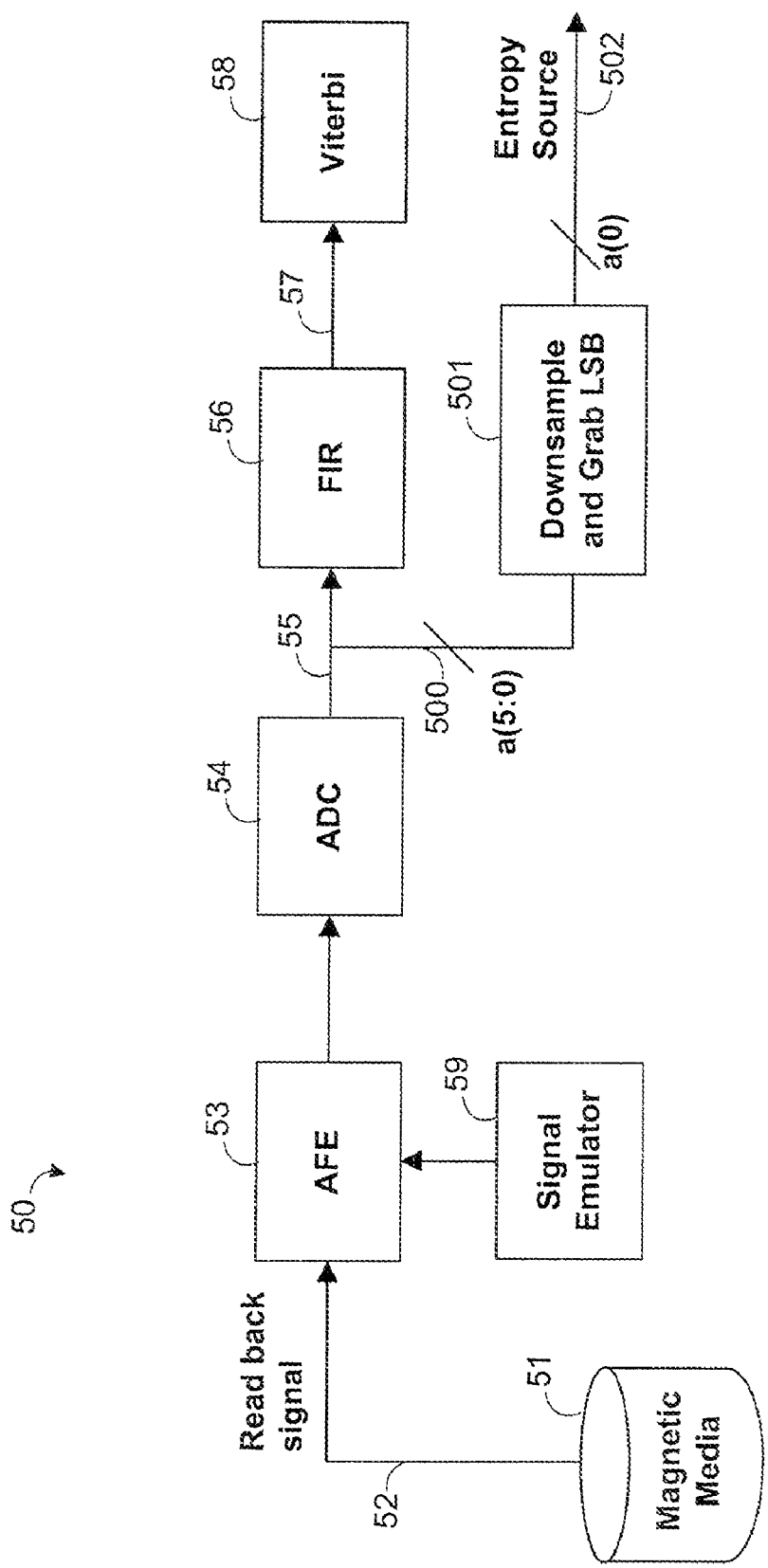
FIG. 5 is a schematic diagram showing how entropy bits may be sampled from a read data channel.

As stated above, channel noise manifests itself in the least significant bits—if it were otherwise, the noise would overwhelm the data—e.g., of the output signals of ADC 54 or FIR filter 56 (see FIG. 5). Therefore, in one embodiment the least significant bits are sampled as the entropy bits. However, if the underlying transmitted bits are too regular, the noise may not be sufficiently random (e.g., if the noise is primarily data dependent—i.e., is a strong function of the written bits—then if the underlying data pattern is periodic, such as 11001100 . . . , the noise may be periodic as well). For example, in some embodiments the signals may not be sampled during the repetitious preamble and postamble patterns in the data, but only after a sync-byte detect signal indicates that actual data have been detected. Similarly, in some embodiments the signals may not be sampled during a thermal asperity event or other detected defect, when the signals may either be constant or toggling in a regular pattern.

Figure 4:
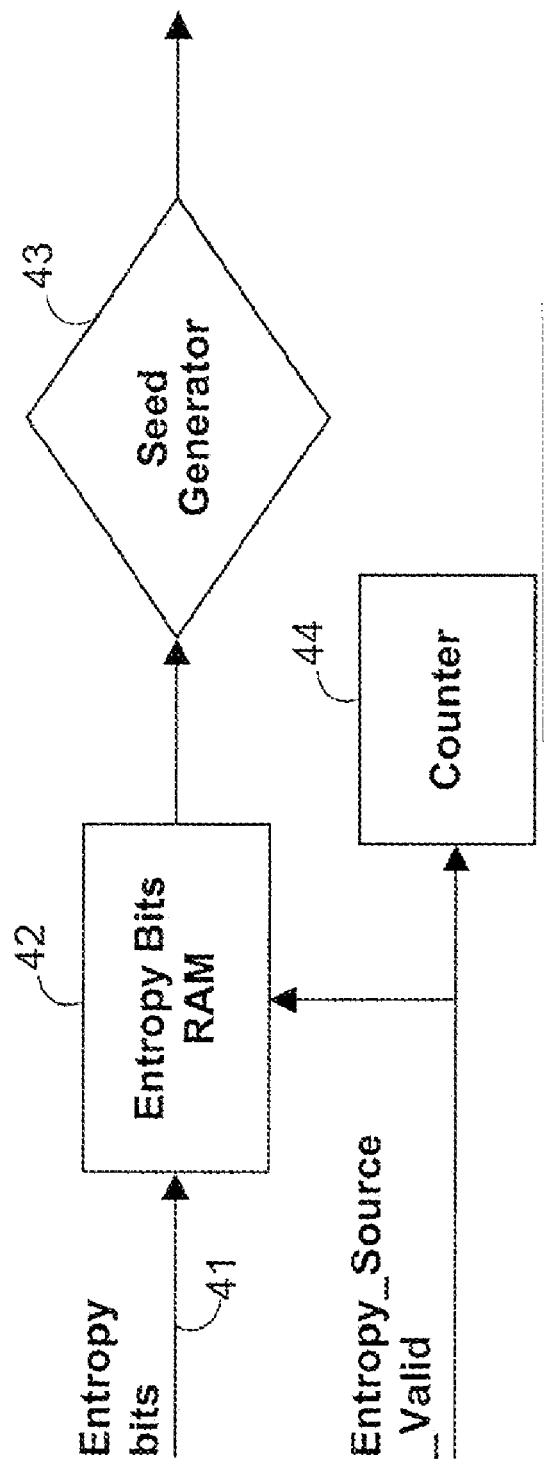
FIG. 4 is a schematic diagram showing generation and buffering of entropy bits into memory for use in seed generation.

The number of bits required is not great and therefore the data may be downsampled (as by exclusive-ORing as described above) to as little as one bit per channel symbol. The signals from which the random noise bits are extracted may not be the transmitted data themselves. Instead the random noise bits may be extracted from signals obtained during the signal processing that is performed on the received waveform in order to recover the transmitted data bits. Some of these signals may be digital and some may be analog. Some may arrive at the baud rate—one for every transmitted bit, while others may be oversampled—multiple samples per one transmitted bit. Some signals—such as, the aforementioned FIR and ADC outputs—may arrive as one sample per transmitted bit. Because throughput is not an issue, instead of grabbing every ADC output, one might opt to sample only every 10th ADC output (i.e., one bit per symbol), essentially trading throughput for complexity. Further down-sampling may occur during the post-processing stage. As shown in FIG. 4, the entropy bits 41 derived from the channel may be buffered in to a memory (e.g., RAM) 42 that is accessible by the firmware (or hardware) 43 in which seed generator 20 is implemented.

The size of the RAM 42 preferably may be determined by the down-sampling rate of the entropy source, and by the rate at which the bits, once buffered, can be further processed. This will be implementation dependent.

An additional counter 44 (NUM_RECEIVED_ENTROPY_BITS), may be provided to keep track of number of entropy bits received from the channel, to determine when the requested number of bits has been reached. The ENTROPY_SOURCE_VALID signal may be used to disable both RAM 42 and counter 44—e.g., during a thermal asperity event or other detected defect, as discussed above.

FIG. 5 shows how entropy bits may be sampled from a read data channel 50. Analog data signal 52 is read from media 51 and processed through analog front end (AFE) 53, which may include low-pass filtering, gain control, etc. The filtered signal is then digitized in analog-to-digital converter (ADC) 54. The digitized data 55 are passed to finite impulse response (FIR) filter 56 for equalization and filtering, and filtered data 57 are passed Viterbi detector 58 for decoding.

In accordance with an embodiment of the present invention, the least significant bits of digitized data 55 are also used as a source of entropy bits. As stated above, any noise in the signal would tend to cluster in the least significant bits; if it were present in more significant bits, the "noise" would overwhelm the signal. In the embodiment shown, data 55 include six bits 500 (5:0), which may be downsampled at 501 to one bit, as shown.

In cases where a seed is required but no data are being read, it is possible to perform a read of some predetermined portion of media 51. However, rather than spin the disk unnecessarily, a signal emulator 59 may be provided to generate a data stream from which entropy bits can be derived in cases where no data are being read. The continuous waveform provided to the channel detector by emulator 59 may be noise free. However, electronic noise will be picked up in the course of processing the signal. That noise will then be captured by the entropy generator. Alternatively, if, as discussed above, a seed is sought before the maximum number of random numbers has been generated from the previous seed, it should almost always be possible to wait for the next read operation to derive the next seed.

Figure 6:
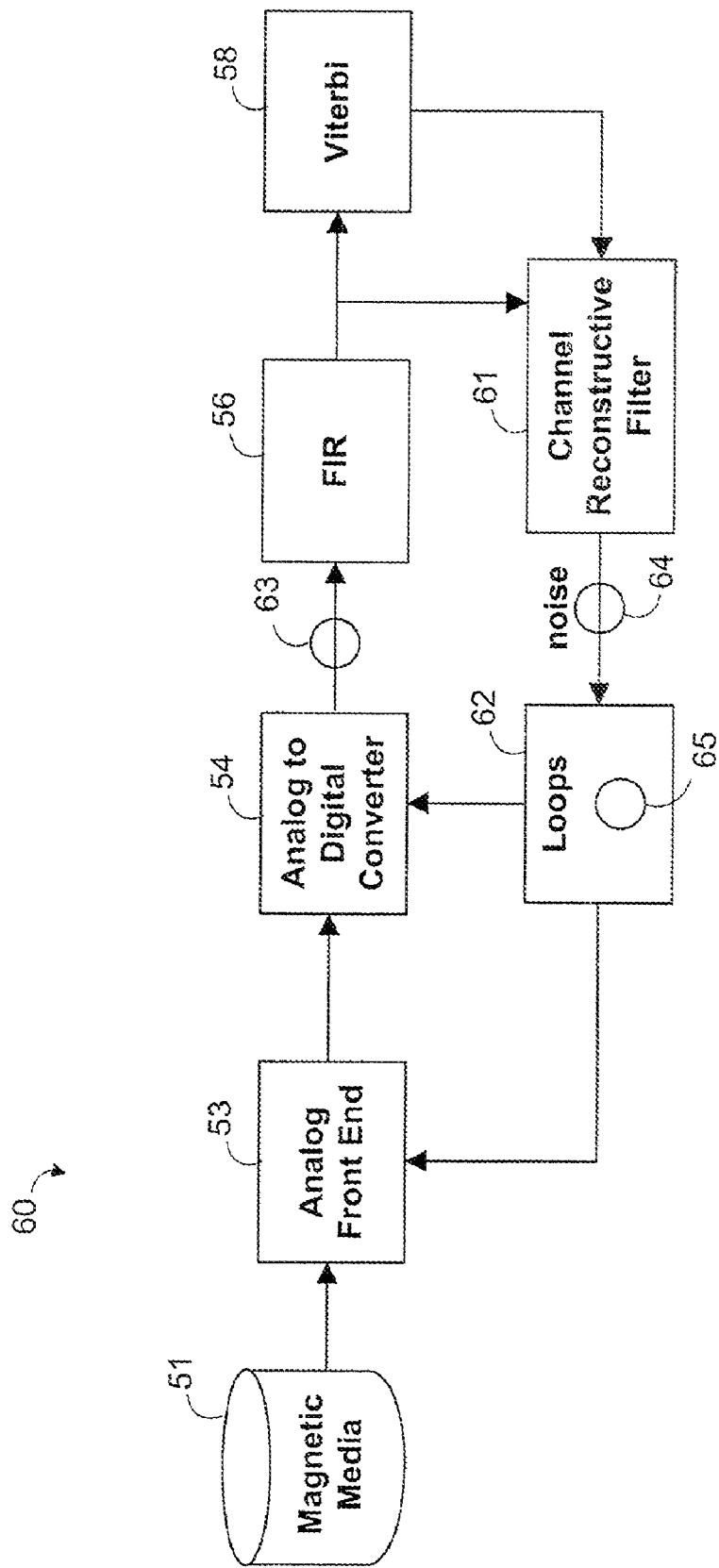
FIG. 6 is a schematic diagram of a read data channel showing where entropy bits may be sampled.

FIG. 6 shows a more complete read data channel 60, but without the entropy bit derivation components 500-502. Channel 60 includes media 51, analog front end (AFE) 53, analog-to-digital converter (ADC) 54, finite impulse response (FIR) filter 56, and Viterbi detector 58 as in FIG. 5. Channel 60 also includes channel reconstructive filter 61, as well as loops 62 that are responsible for acquiring timing, gains, and also adapting FIR filter taps. Although in FIG. 5, the entropy bits are tapped at point 63 directly after digitization at ADC 54, in fact they also can be tapped at least at point 64 after channel reconstructive filter 61 or point 65 within loops 62. Although the noise present at point 63 may be filtered in FIR filter 56 and channel reconstructive filter 61, and the "shape" of the noise will be different, the random nature of the noise is not changed by filtering. Therefore, the noise can be tapped for entropy bits essentially anywhere after digitization.

Thus it is seen that random numbers in a data storage device can be generated quickly using a DRBG with an entropy source based on characteristics of the device itself to provide a ready source of seeds for the DRBG without adding additional hardware.

Referring now to FIGS. 7-14, exemplary implementations of the present invention are shown.

Figure 7:
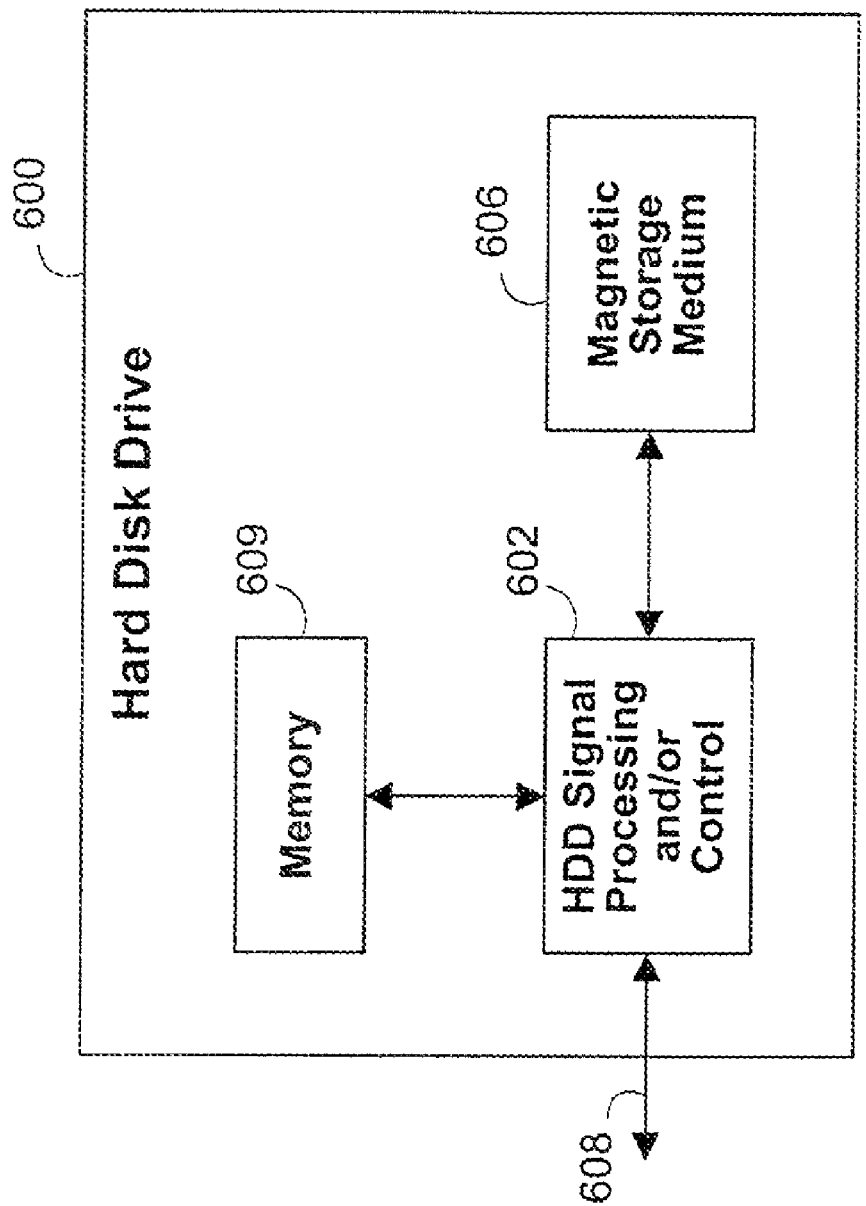
FIG. 7 is a block diagram of an exemplary hard disk drive that can employ the disclosed technology.

Referring now to FIG. 7, an embodiment of the present invention can be implemented in a hard disk drive 600. This embodiment of the present invention may implement either or both signal processing and/or control circuits, which are generally identified in FIG. 7 at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606.

The HDD 600 may communicate with a host device (not shown) such as a computer, mobile computing devices such as personal digital assistants, cellular telephones, media or MP3 players and the like, and/or other devices, via one or more wired or wireless communication links 608. The HDD 600 may be connected to memory 609 such as random access memory (RAM), low latency nonvolatile memory such as flash memory, read only memory (ROM) and/or other suitable electronic data storage.

Figure 8:
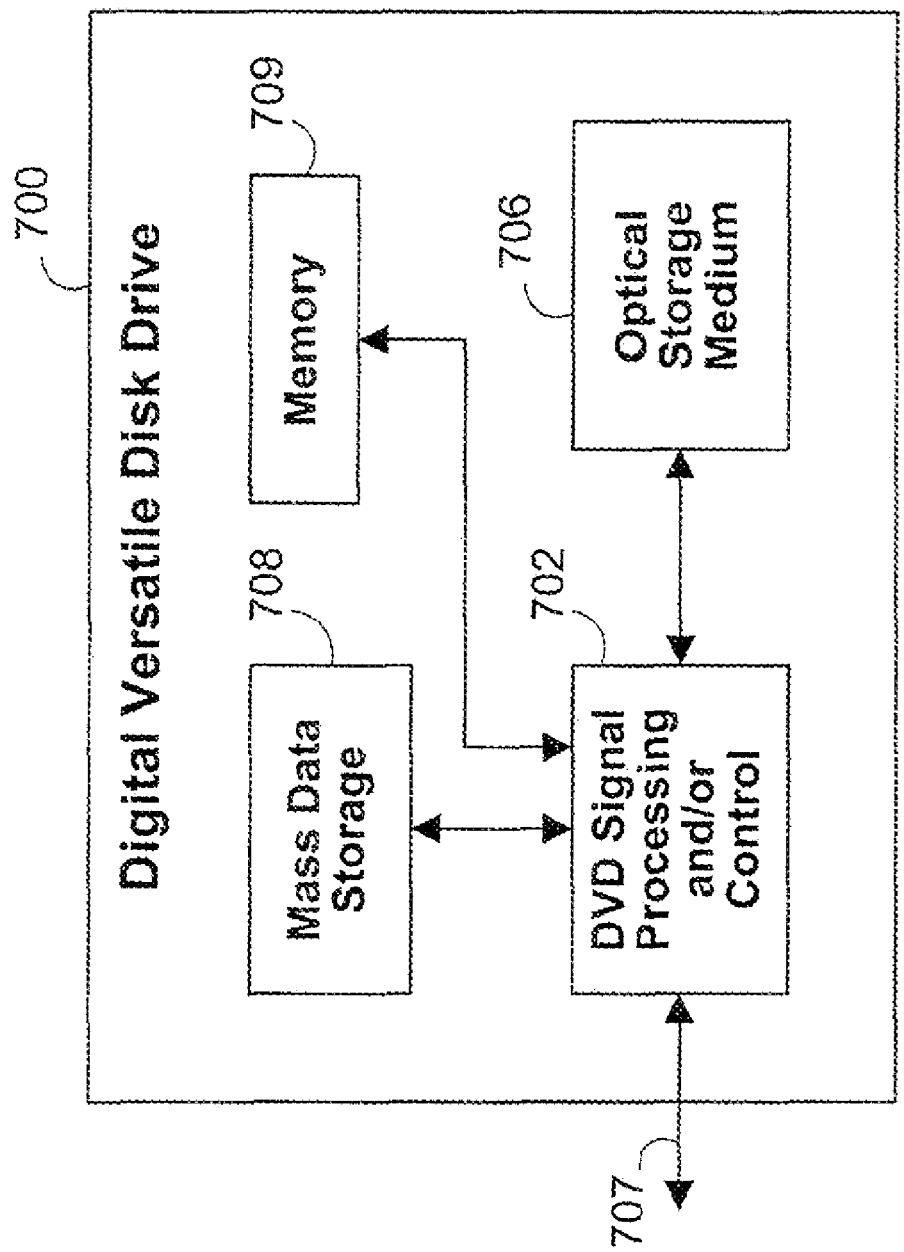
FIG. 8 is a block diagram of an exemplary digital versatile disk drive that can employ the disclosed technology.

Referring now to FIG. 8, an embodiment of the present invention can be implemented in a digital versatile disk (DVD) drive 700. This embodiment of the present invention may implement either or both signal processing and/or control circuits, which are generally identified in FIG. 8 at 702, and/or mass data storage of the DVD drive 700. The signal processing and/or control circuit 702 and/or other circuits (not shown) in the DVD drive 700 may process data, perform coding and/or encryption, perform calculations, and/or format data that is read from and/or data written to an optical storage medium 706. In some implementations, the signal processing and/or control circuit 702 and/or other circuits (not shown) in the DVD drive 700 can also perform other functions such as encoding and/or decoding and/or any other signal processing functions associated with a DVD drive.

DVD drive 700 may communicate with an output device (not shown) such as a computer, television or other device, via one or more wired or wireless communication links 707. The DVD drive 700 may communicate with mass data storage 708 that stores data in a nonvolatile manner. The mass data storage 708 may include a hard disk drive (HDD). The HDD may have the configuration shown in FIG. 7 The HDD may be a mini-HDD that includes one or more platters having a diameter that is smaller than approximately 1.8". The DVD drive 700 may be connected to memory 709 such as RAM, ROM, low-latency nonvolatile memory such as flash memory, and/or other suitable electronic data storage.

Figure 9:
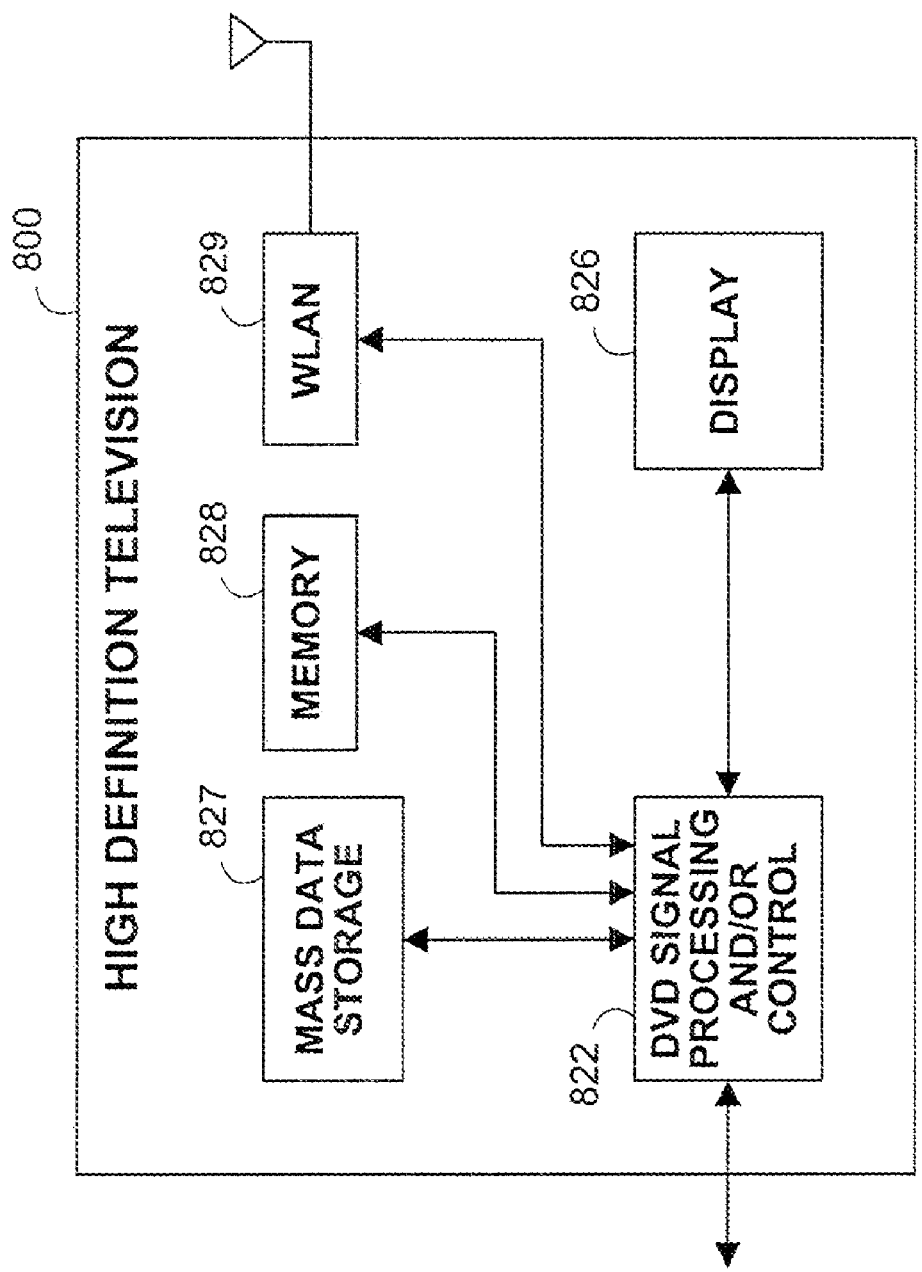
FIG. 9 is a block diagram of an exemplary high definition television that can employ the disclosed technology.

Referring now to FIG. 9, an embodiment of the present invention can be implemented in a high definition television (HDTV) 800. This embodiment of the present invention may implement either or both signal processing and/or control circuits, which are generally identified in FIG. 9 at 822, a WLAN interface and/or mass data storage of the HDTV 800. The HDTV 800 receives HDTV input signals in either a wired or wireless format and generates HDTV output signals for a display 826. In some implementations, signal processing circuit and/or control circuit 822 and/or other circuits (not shown) of the HDTV 800 may process data, perform coding and/or encryption, perform calculations, format data and/or perform any other type of HDTV processing that may be required.

The HDTV 800 may communicate with mass data storage 827 that stores data in a nonvolatile manner such as optical and/or magnetic storage devices. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". The HDTV 800 may be connected to memory 828 such as RAM, ROM, low-latency nonvolatile memory such as flash memory, and/or other suitable electronic data storage. The HDTV 800 also may support connections with a WLAN via a WLAN network interface 829.

Figure 10:
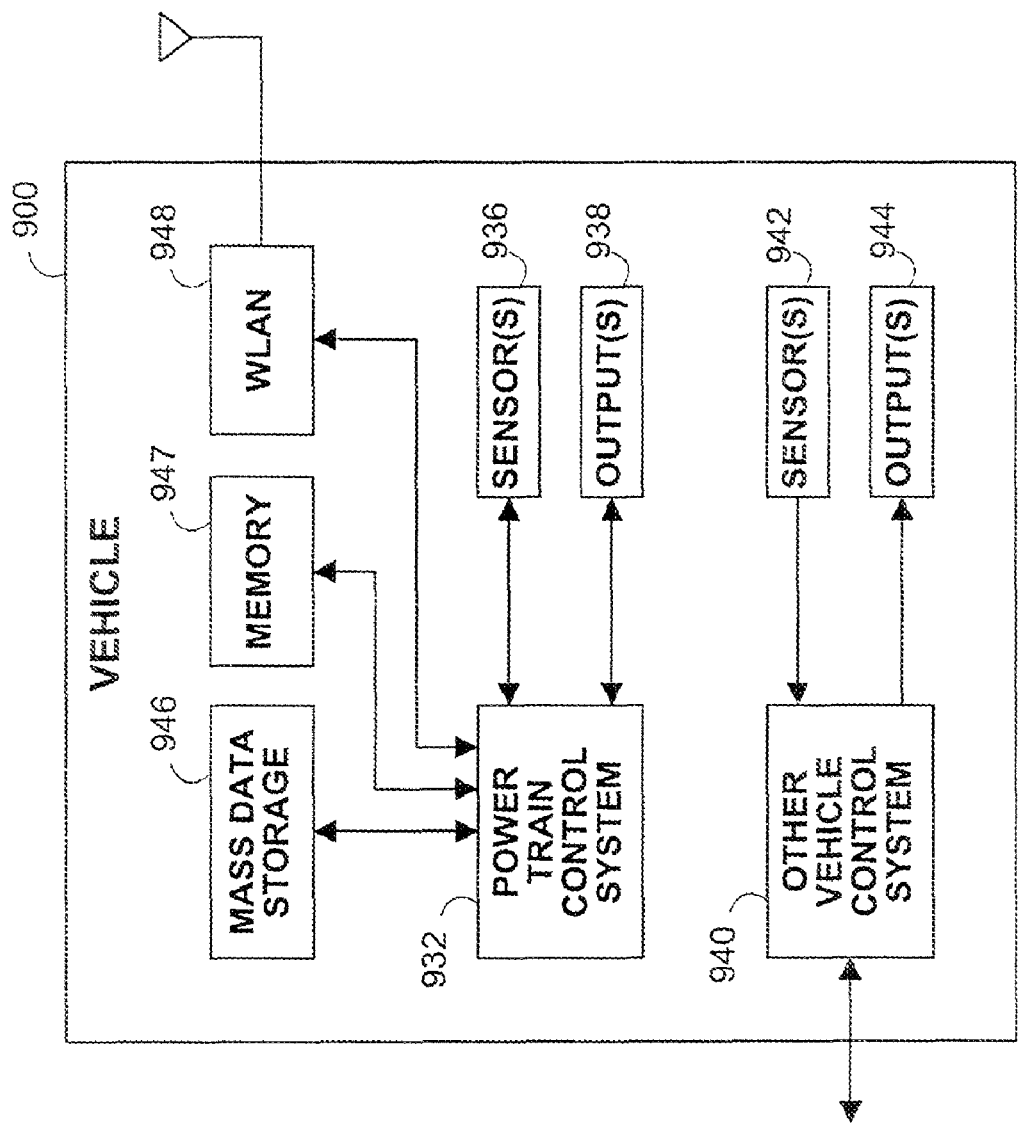
FIG. 10 is a block diagram of an exemplary vehicle that can employ the disclosed technology.

Referring now to FIG. 10, an embodiment of the present invention implements a control system of a vehicle 900, a WLAN interface and/or mass data storage of the vehicle control system. In some implementations, this embodiment of the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

Embodiments of the present invention may also be implemented in other control systems 940 of the vehicle 900. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". The powertrain control system 932 may be connected to memory 947 such as RAM, ROM, low latency nonvolatile memory such as flash memory, and/or other suitable electronic data storage. The powertrain control system 932 also may support connections with a WLAN via a WLAN network interface 948. The control system 940 may also include mass data storage, memory and/or a WLAN interface (none shown).

Figure 11:
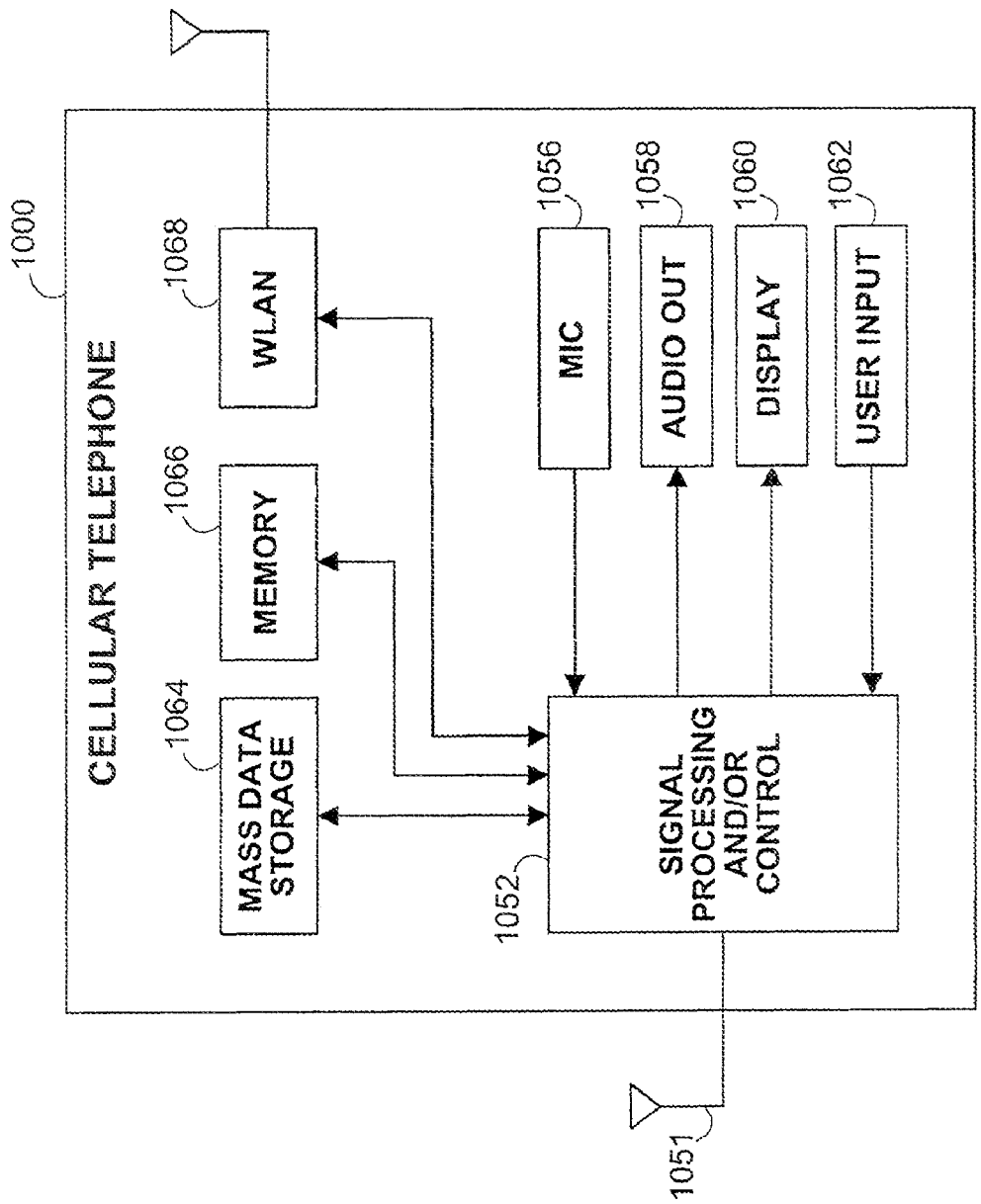
FIG. 11 is a block diagram of an exemplary cellular telephone that can employ the disclosed technology.

Referring now to FIG. 11, an embodiment of the present invention can be implemented in a cellular telephone 1000 that may include a cellular antenna 1051. This embodiment of the present invention may implement either or both signal processing and/or control circuits, which are generally identified in FIG. 11 at 1052, a WLAN interface and/or mass data storage of the cellular phone 1000. In some implementations, the cellular telephone 1000 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular telephone 1000 may process data, perform coding and/or encryption, perform calculations, format data and/or perform other cellular telephone functions.

The cellular telephone 1000 may communicate with mass data storage 1064 that stores data in a nonvolatile manner such as optical and/or magnetic storage devices—for example hard disk drives (HDDs) and/or DVDs. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". The cellular telephone 1000 may be connected to memory 1066 such as RAM, ROM, low-latency nonvolatile memory such as flash memory, and/or other suitable electronic data storage. The cellular telephone 1000 also may support connections with a WLAN via a WLAN network interface 1068.

Figure 12:
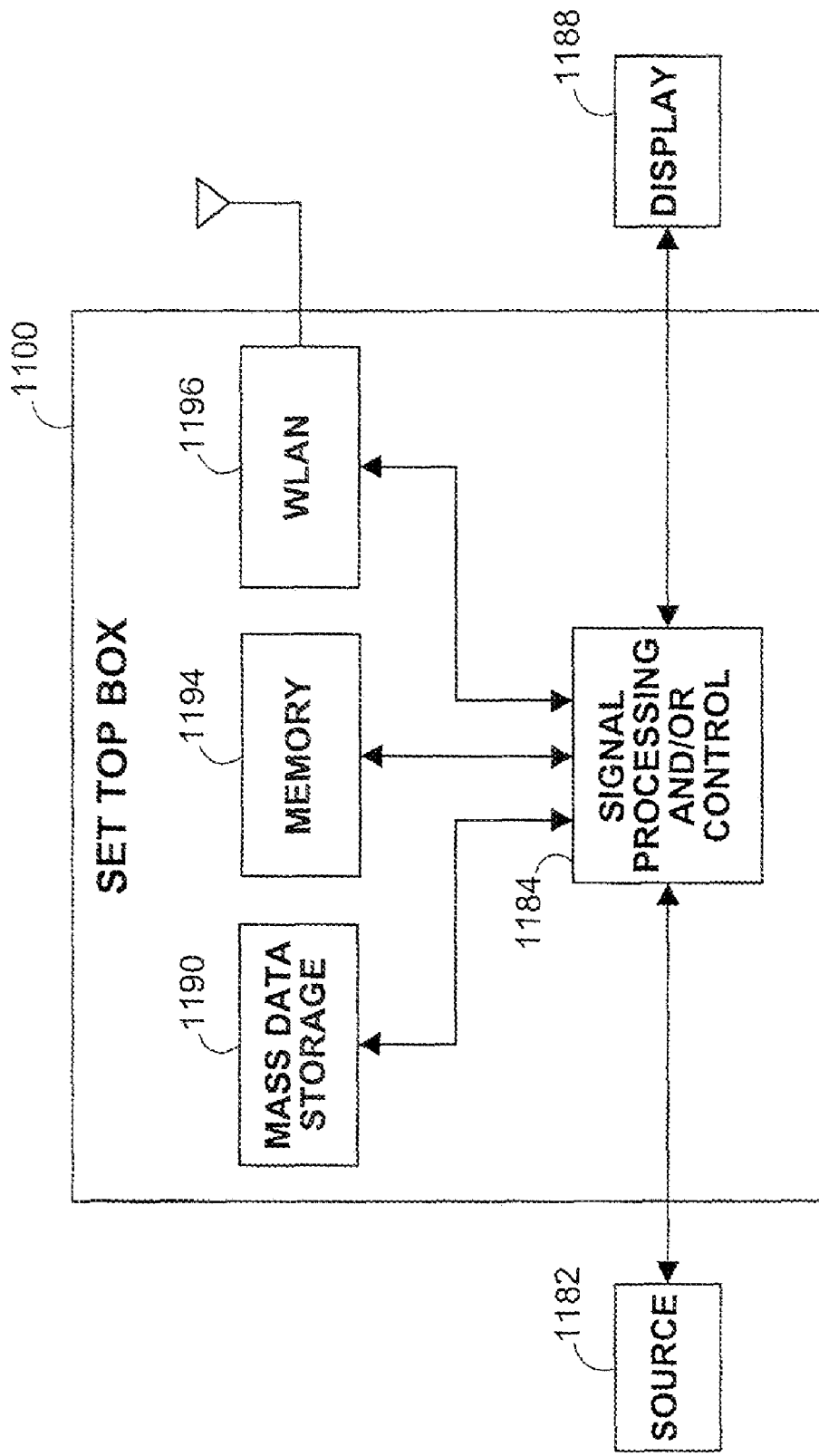
FIG. 12 is a block diagram of an exemplary set top box that can employ the disclosed technology.

Referring now to FIG. 12, an embodiment of the present invention can be implemented in a set top box 1100. This embodiment of the present invention may implement either or both signal processing and/or control circuits, which are generally identified in FIG. 12 at 1184, a WLAN interface and/or mass data storage of the set top box 1100. Set top box 1100 receives signals from a source 1182 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1100 may process data, perform coding and/or encryption, perform calculations, format data and/or perform any other set top box function.

Set top box 1100 may communicate with mass data storage 1190 that stores data in a nonvolatile manner. The mass data storage 1190 may include optical and/or magnetic storage devices for example hard disk drives HDD and/or DVDs. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". Set top box 1100 may be connected to memory 1194 such as RAM, ROM, low-latency nonvolatile memory such as flash memory, and/or other suitable electronic data storage. Set top box 1100 also may support connections with a WLAN via a WLAN network interface 1196.

Figure 13:
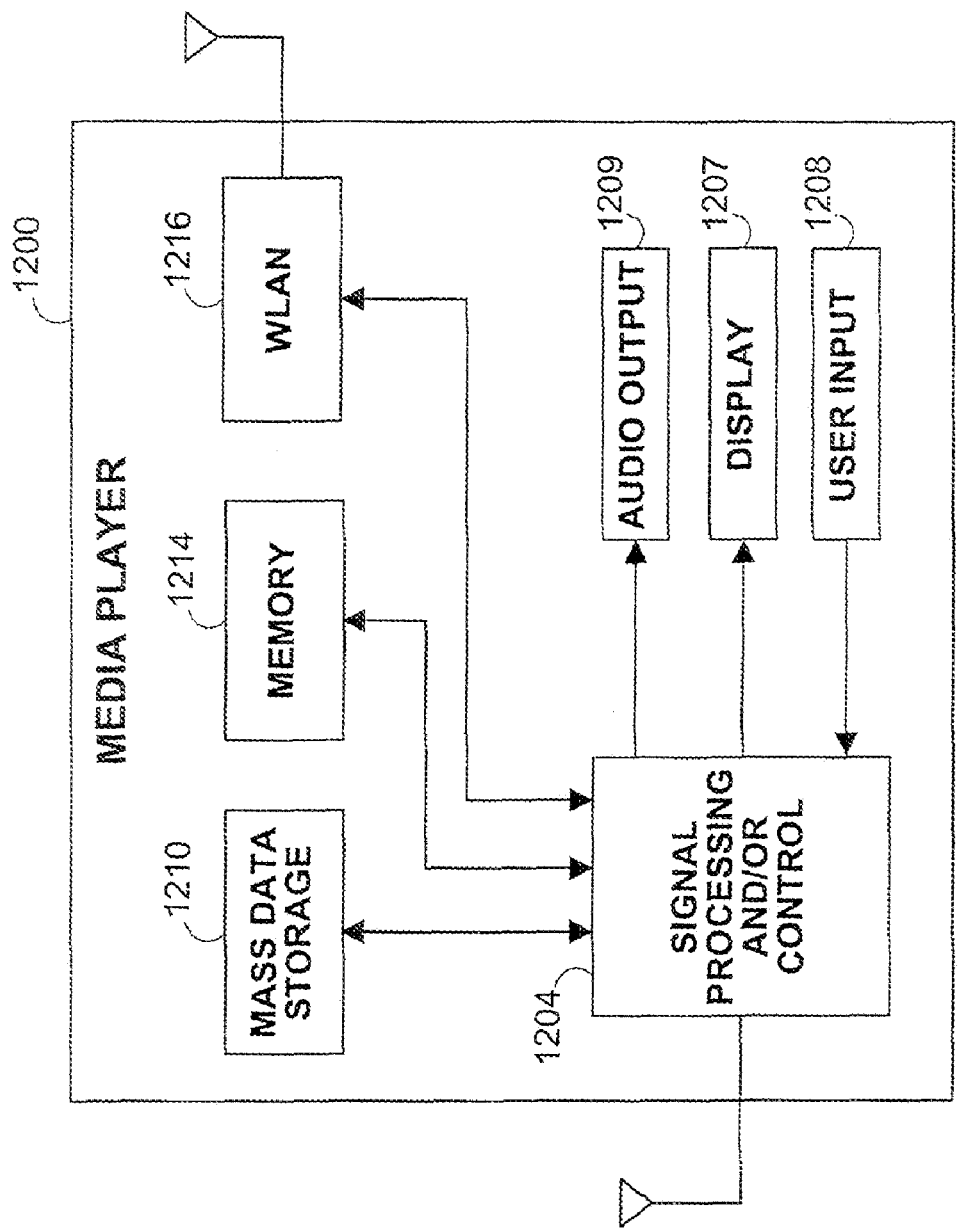
FIG. 13 is a block diagram of an exemplary media player that can employ the disclosed technology.

Referring now to FIG. 13, an embodiment of the present invention can be implemented in a media player 1200. This embodiment of the present invention may implement either or both signal processing and/or control circuits, which are generally identified in FIG. 13 at 1204, a WLAN interface and/or mass data storage of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. Media player 1200 further includes an audio output 1209 such as a speaker and/or audio output jack. The signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". Media player 1200 may be connected to memory 1214 such as RAM, ROM, low-latency nonvolatile memory such as flash memory, and/or other suitable electronic data storage. Media player 1200 also may support connections with a WLAN via a WLAN network interface 1216. Still other implementations in addition to those described above are contemplated.

Figure 14:
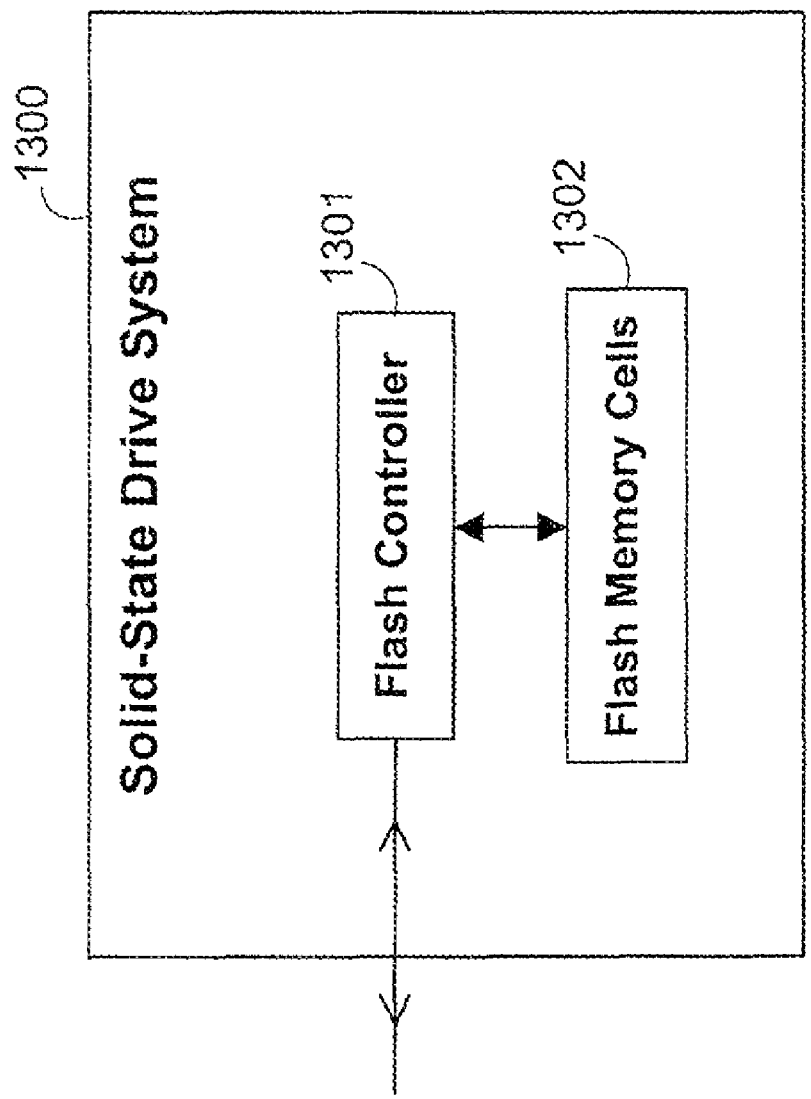
FIG. 14 is a block diagram of an exemplary solid state drive system that can employ the disclosed technology.

Referring now to FIG. 14, an embodiment of the present invention can be implemented in a solid-state drive 1300. This embodiment of the present invention may include flash memory cells 1301 or other low-latency nonvolatile memory, and/or other suitable electronic data storage. In some implementations, a flash controller 1302, which may function as an interface to flash memory cells 1301, and/or other circuits (not shown) in the solid-state drive 1300 may process data, perform coding and/or encryption, perform calculations, and/or format data that is output to and/or received from flash memory cells 1301. Still other implementations in addition to those described above are contemplated.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A random number generator that generates random numbers for use in a device having a data channel, said random number generator comprising:
    a deterministic random bit generator; and
    a seed generator that generates reliably random seeds for said deterministic random bit generator based on noise in said data channel.

2. The random number generator of claim 1 wherein said device comprises a hard disk drive.

3. The random number generator of claim 1 wherein said seed generator comprises:
    an entropy bit generator that extracts bits of said noise; and
    a post-processor that removes bias from said extracted bits.

4. The random number generator of claim 3 wherein said post-processor is provided in firmware.

5. The random number generator of claim 3 wherein:
    said data channel includes an analog data source and an analog-to-digital converter; and
    said entropy bit generator extracts said bits from a signal in said data channel after said signal has been output by said analog-to-digital converter.

6. The random number generator of claim 5 wherein:
    said data channel further comprises filter circuitry that filters said signal after said signal has been output by said analog-to-digital converter; and
    said entropy bit generator extracts said bits before said signal is filtered by said filter circuitry.

7. The random number generator of claim 5 wherein:
    said data channel further comprises filter circuitry that filters said signal after said signal has been output by said analog-to-digital converter; and
    said entropy bit generator extracts said bits after said signal has been filtered by at least a portion of said filter circuitry.

8. The random number generator of claim 7 wherein:
    said entropy bit generator extracts said bits after said signal has been filtered by said filter circuitry.

9. The random number generator of claim 3 wherein said data channel further comprises a signal generator for emulating a data signal to generate entropy bits when said analog data source is not in use.

10. A method for generating random numbers in a device having a data channel subject to noise, said method comprising:
    generating reliably random seeds from said noise in said data channel; and
    using said reliably random seeds to seed a deterministic random bit generator in said device.

11. The method of claim 10 wherein said generating comprises generating said reliably random seeds from a data channel in a hard disk drive.

12. The method of claim 10 wherein:
said generating comprises extracting bits from said noise;
said method further comprising:
post-processing said extracted bits to remove bias therefrom.

13. The method of claim 10 further comprising:
reading a source of analog data; and
converting said analog data to a digital signal; wherein
said generating comprises extracting bits from said digital signal after conversion.

14. The method of claim 13 further comprising:
filtering said digital signal; wherein:
said extracting occurs after said conversion and before said filtering.

15. The method of claim 13 further comprising:
filtering said digital signal; wherein:
said extracting occurs after at least a portion of said filtering.

16. The method of claim 15 wherein said extracting occurs after said filtering.

17. The method of claim 10 further comprising emulating a data signal to generate entropy bits when there is no active data signal on said data channel.

* * * * *